Dec. 21, 1965  W. T. SAWYER  3,224,591
OIL FILTER GASKET SUPPORT
Filed April 19, 1963
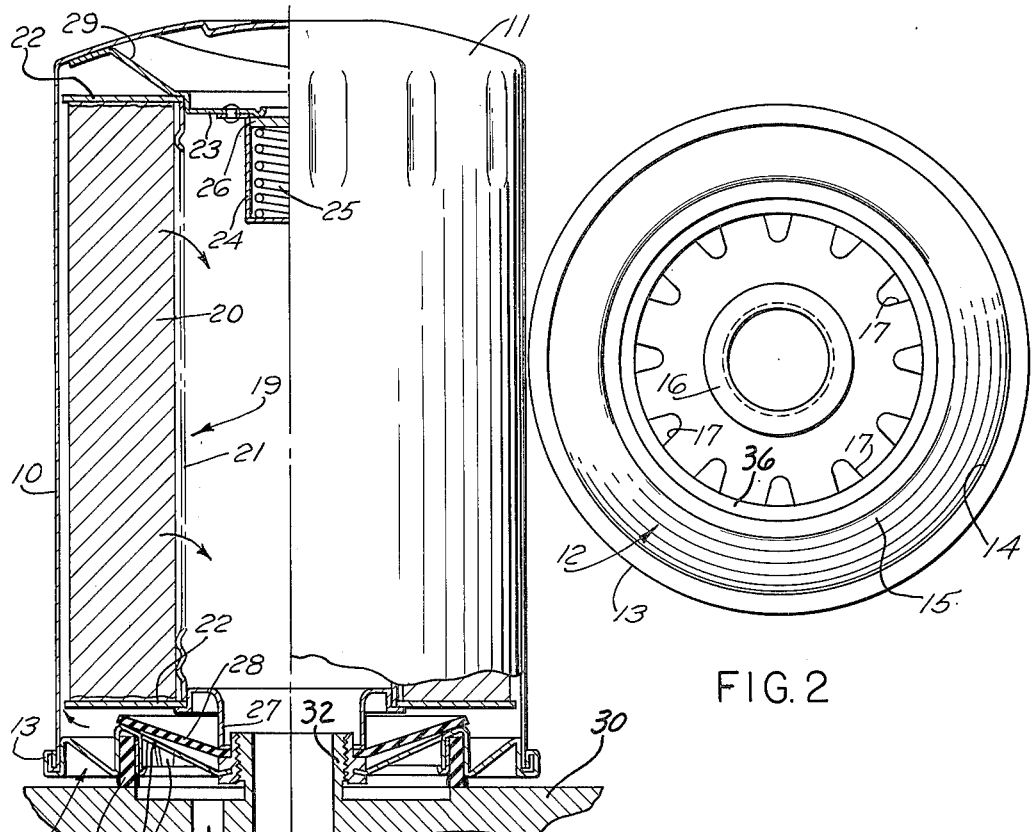
FIG. 1
FIG. 2
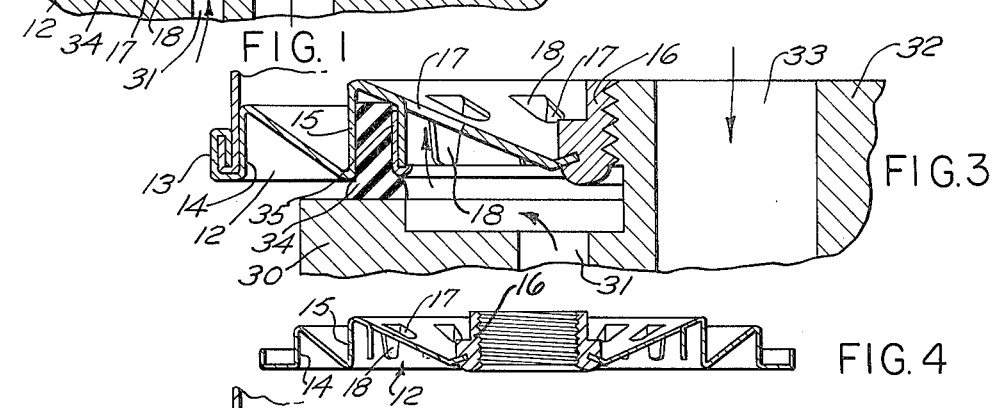
FIG. 3
FIG. 4
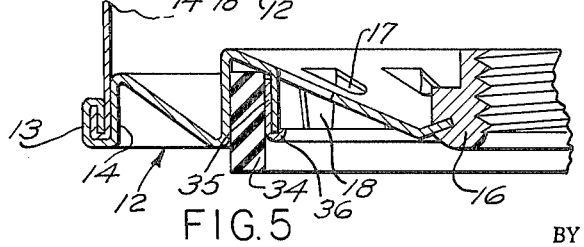
FIG. 5
INVENTOR.
WILLIAM T. SAWYER
BY
Charles C. Willson
ATTORNEY United States Patent Office 3,224,591
Patented Dec. 21, 1965

3,224,591
OIL FILTER GASKET SUPPORT
William T. Sawyer, Pawtucket, R.I., assignor to Fram Corporation, Providence, R.I., a corporation of Rhode Island
Filed Apr. 19, 1963, Ser. No. 274,110
2 Claims. (Cl. 210—440)

This invention relates to oil filters of the screw-on throw-away type having a cup-shaped shell enclosing a filter cartridge, and provided with a thin sheet metal member that closes the end of the shell.

These oil filters need to be constructed to withstand a relatively high internal pressure such as may occur when the motor vehicle provided with such filter is cold and the oil is thick and difficult to force through the lubricating system or when the oil pressure regulating valve malfunctions. Under these conditions a high hydraulic pressure may be exerted on the metal member that closes the end of the filter shell. If such end closure is made of thin sheet metal to lessen the cost of the same, it will tend to bulge outwardly under the hydraulic pressure just mentioned.

To strengthen such thin metal member that closes the end of the shell, it has been proposed heretofore to bend such end member to provide the same with one or more annular reinforcing ribs or bands. One such band has been formed heretofore to fit snugly against the inner wall adjacent the end of the filter shell, and another such band has been formed inwardly from the first band, where it reinforces the end member and forms an annular wall that surrounds an annular gasket provided to make an oil-tight seal at this end of the filter when such filter is in its operating position.

It has been proposed heretofore to form oil inlet holes in the end member just inside of the sealing annular gasket and to bend the metal cut in forming such holes to form projecting tabs that engage the inner face of the gasket to hold such gasket in place.

This makes a simple and inexpensive means for retaining the annular gasket in its operating position; but as the filter shell is rotated to screw the same into tigh sealing engagement with the engine block or other supporting means, the gasket is subjected to a compressing force and also to a twisting action. The first causes the gasket to bulge laterally between the spaced tabs, and the second causes the tabs to dig into the gasket. These forces are frequently so severe that they damage the gasket and cause oil leakage to occur.

Having in mind the foregoing, the present invention resides first in the correct analysis of the cause of the frequent damage to these annular gaskets, and second in simple means for overcoming this difficulty. The present means for preventing the gasket from being damaged resides in a smooth support placed between the inner face of the annular gasket and the tabs, so that the tabs are prevented from engaging the gasket.

The above and other features of the invention will be further understood from the following description when read in connection with the accompanying drawing, wherein:

FIG. 1 is a vertical sectional view through a screw-on type of oil filter embodying the present invention.

FIG. 2 is an end view of the screw-on end of the filter of FIG. 1.

FIG. 3 is an enlarged section of part of the filter shown in FIG. 1.

FIG. 4 is a sectional view through the filter end plate; and

FIG. 5 is a sectional view of the filter parts shown in FIG. 3 with the engine block supporting means omitted.

The present invention, as above stated, relates to a screw-on type of oil filter having a thin end plate at the oil inlet end of the filter, and the invention resides particularly in improved supporting means for the end sealing gasket. Therefore the construction of most of the filter shown may be varied extensively. As herein shown they are, except for the screw-on end of the filter, more or less similar to the corresponding parts shown in the U.S. Patent No. 2,888,141 which is assigned to the assignee of the present application.

In the drawing, 10 designates a cup-shaped shell or housing having the integral closed end 11. The other end of this shell has the relatively thin closure plate 12 which is secured to the end of the shell 10 by the rolled seam 13. In order that the end plate 12 will withstand the high internal pressure of the oil confined in the shell, this plate is provided with one or more annular reinforcing ribs. As shown in the drawing, the plate 12 has a band 14 that fits against the inner wall of the shell 10, and a reinforcing rib that has the annular band 15.

The end plate 12 has a central opening adapted to receive the internally threaded sleeve 16 that is swaged or otherwise secured to such plate. This plate 12 is provided with the holes 17 formed to permit oil to pass into the filter housing 10, and each hole has an extended tab 18 located inwardly from and parallel to the band 15 as shown.

The filter shell 10 has permanently housed therein a filter cartridge 19 that may be variously constructed, but is preferably formed of pleated paper 20 that surrounds a perforated center tube 21. The upper and lower ends of the pleated element are closed by caps 22 bonded to the ends of the pleats. The central opening in the cartridge 19 is closed at its upper end by a closure member 23 to which is secured the yoke 24 that houses the coiled spring 25. This spring holds a relief valve 26 yieldingly in its closed position.

At the lower end of the cartridge 19 is a supporting ring 27 that supports the cartridge in spaced relation to the end plate 12. This ring rests on a rubber ring 28 that forms an anti-drain valve, and the cartridge rests on an outer annular flange of the ring 27. The closure member 23 has the outwardly projecting spring legs 29 that engage the inner face of the end wall 11 and exerting a hold-down pressure on the cartridge 19 to hold it firmly seated on the ring 27.

All of the foregoing construction may be varied extensively and is here described to make clear the features of the present invention now to be described.

It is important that when the oil filter above described is screwed tightly into place in its oil filtering position, no leakage will occur between the filter and its supporting means, such as the engine block 30. This block has the oil passage 31 and threaded post 32 adapted to have screwed thereon the internally threaded sleeve 16 of the filter. The post 32 has the central passage 33 for the flow of oil therethrough. To prevent oil leakage between the filter and its support, a sealing gasket 34 is provided in the form of a compressible ring that is confined between the inner wall of the band 15 and the row of tabs 18.

It has been found in practice that the tabs 18 supporting the inner face of the gasket 34 are likely to indent the gasket when the same is subjected to the severe twisting forces applied as during installation, and the strong clamping force that exists when the filter is in the installed position. This engagement of the tabs with the inside face of the gasket at the spaced intervals is found to deform the gasket as a result of the twisting incurred, particularly when the gasket is not properly lubricated so as to rotate freely on the engine block, and leakage is likely to occur.

This difficulty is overcome in accordance with the present invention by providing a ring 35 between the inner face of the gasket 34 and the row of tabs 18. This ring provides a smooth surface against the inner face of the gasket and has a laterally projecting ledge 36 that lies over the ends of the tabs.

As a result of this construction, the outer face of the gasket is engaged by the smooth wall of the band 15 and the inner face of this gasket is similarly engaged by the ring 35. Therefore, the gasket is not subjected to the severe twisting force that interferes with an adequate seal; and the pressure on the gasket which causes it to spread laterally as shown in FIG. 3 will be supported by the rounded shoulder of the band 15 and by the projecting ledge 36 of the ring 35. This ring prevents the gasket 34 from being damaged when the oil filter is being screwed into its filtering position and while it remains in such position.

The flow of oil into and out of the filter is, as indicated by the arrows, inwardly through the hole 31 and holes 17, then around the filter cartridge 19 and inwardly through the pleated paper 20 to pass out of the filter through the central passage 33.

Having thus described my invention, what I claim and desire to protect by Letters Patent is:

1. In an oil filter of the screw-on throw-away type comprising a cup-shaped shell, a filter element housed therein, a thin metal member closing the inlet end of the shell and having a threaded central ring and an oil passage through such ring, said member being bent within the shell wall at some distance therefrom to form an annular reinforcing rib having an approximately vertical band and said member also having oil holes cut therethrough inwardly of the band so as to form tabs spaced inwardly from the band, and a sealing annular gasket confined in the space between the band and tabs, that improvement comprising a gasket supporting ring separate from said thin metal member confined between the inner wall of the gasket and the tabs and forming a continuous support for this inner gasket wall.

2. The improvement in an oil filter according to claim 1 in which said gasket supporting ring is provided with a laterally extending ledge that overlies the ends of the tabs and engages the gasket when the latter is subjected to a flattening pressure.

References Cited by the Examiner
UNITED STATES PATENTS

| | | | |
|---|---|---|---|
| 2,884,133 | 4/1959 | Walulik et al. | 210—136 |
| 3,042,215 | 7/1962 | Gruner | 210—443 |
| 3,142,640 | 7/1964 | Otto | 210—136 |
| 3,146,194 | 8/1964 | Hathaway | 210—130 |

REUBEN FRIEDMAN, *Primary Examiner.*